Patented Dec. 7, 1926.

1,609,847

UNITED STATES PATENT OFFICE.

FRANK E. VICKERY, OF DAVENPORT, IOWA, ASSIGNOR, BY MESNE ASSIGNMENTS, TO GOLD DUST CORPORATION, OF NEW YORK, N. Y., A CORPORATION OF NEW JERSEY.

LIQUID CLEANING COMPOUND.

No Drawing. Application filed September 27, 1924. Serial No. 740,200.

My invention relates to a liquid cleaning compound, which is specially designed for cleaning glass surfaces, such as window glass, wind shields of automobiles, and the like, for which work the preparation appears to be particularly efficient.

The composition consists in a mixture of tri-sodium phosphate, borax, and water, about nineteen parts of the tri-sodium phosphate being used to one part of borax, and approximately two ounces of the combined tri-sodium phosphate and borax being dissolved in about one hundred and nine pounds of water.

In the preparation of the compound the desired amount of water is subjected to heat until it attains a temperature of about two hundred degrees Fahrenheit, whereupon the tri-sodium phosphate and borax are added, and the heat increased until the water is at a temperature of two hundred and fourteen degrees, at which point it is maintained for some twenty minutes. The compound is then poured into containers in its heated state.

The effect of the borax appears to be to soften the water, and the tri-sodium phosphate, when dissolved in the water, appears to have a powerful cleansing effect.

In use, the compound is preferably applied to the glass by means of a swab, and in an irregular or zig-zag course, after which the entire surface is wiped with a cloth or other article.

What I claim is:

A compound for cleaning glass consisting of a mixture of water, tri-sodium phosphate, and borax, approximately one hundred and nine pounds of water being used for two ounces of the other ingredients, which are in the proportion of nineteen parts of tri-sodium phosphate to one part of borax.

In testimony whereof I affix my signature.

FRANK E. VICKERY.